Jan. 3, 1928.　　　　　　　　　　　　　　　　　1,655,185
P. HATSCHEK
OPTICAL PROJECTION APPARATUS
Filed Oct. 2, 1923　　　　　4 Sheets-Sheet 1
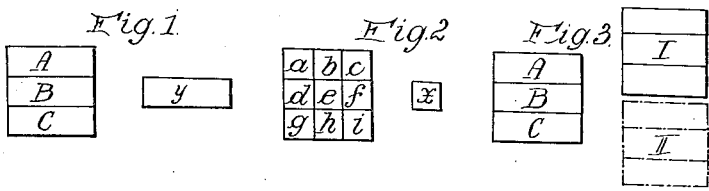
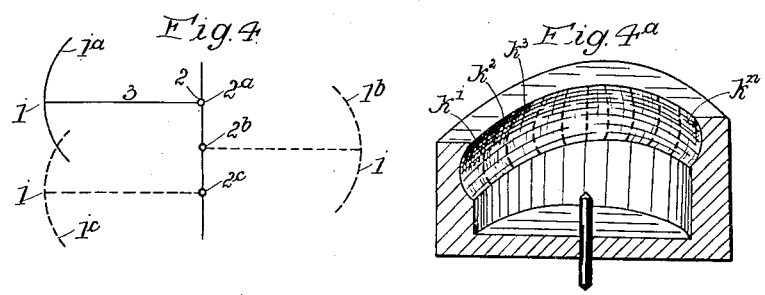
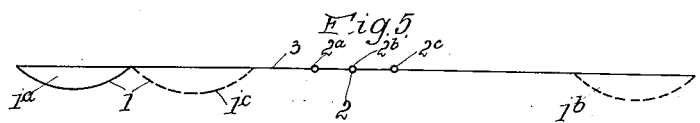
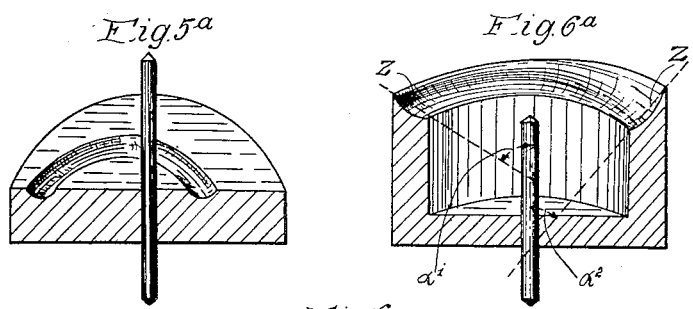
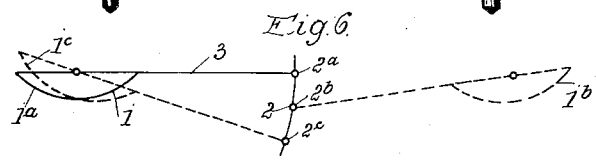
Inventor
Paul Hatschek

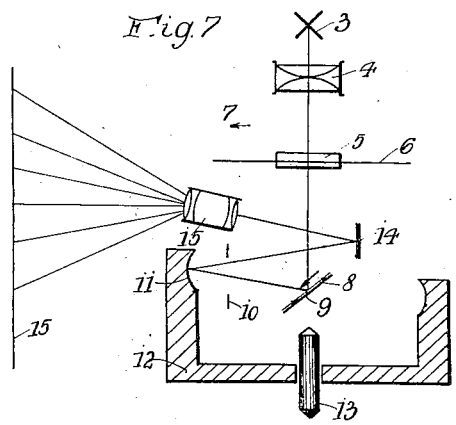
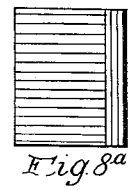
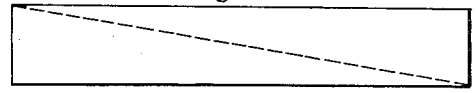
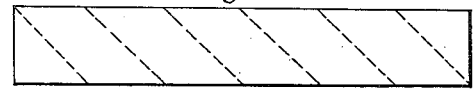
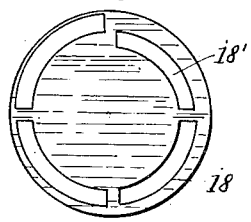
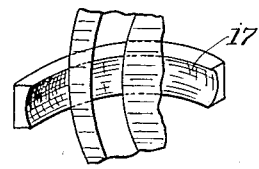
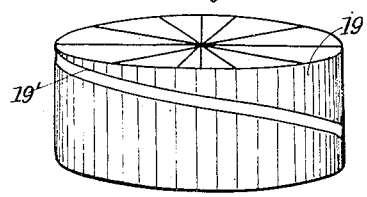
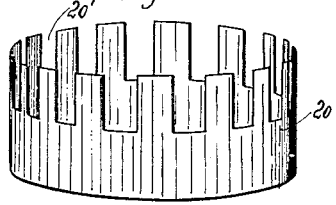

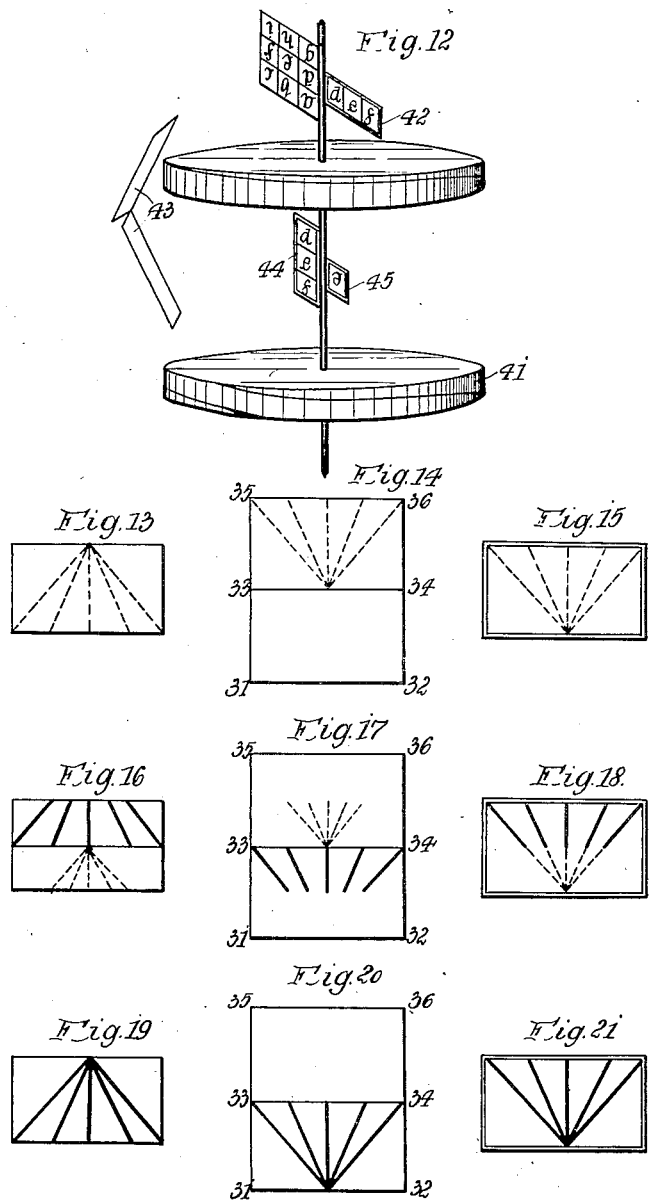

Jan. 3, 1928.
P. HATSCHEK
1,655,185
OPTICAL PROJECTION APPARATUS
Filed Oct. 2, 1923   4 Sheets-Sheet 4
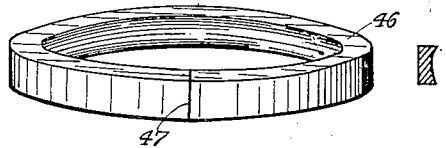
Fig.22ᵃ
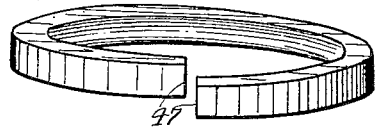
Fig.22ᵇ
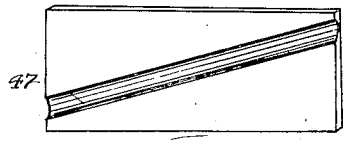
Fig.23ᵃ
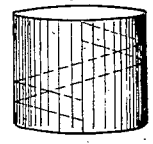
Fig.23ᵇ
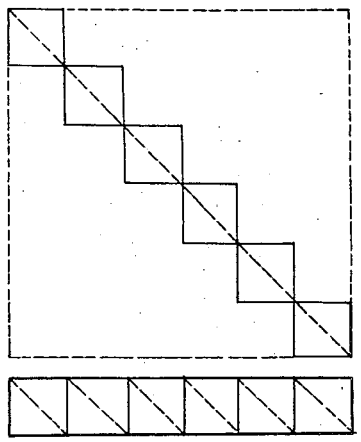
Fig.24
Inventor
Paul Hatschek Patented Jan. 3, 1928.

1,655,185

UNITED STATES PATENT OFFICE.

PAUL HATSCHEK, OF LEIPZIG, GERMANY.

OPTICAL PROJECTION APPARATUS.

Application filed October 2, 1923, Serial No. 666,105, and in Germany November 4, 1922.

It is often necessary, in some of the branches of optics, to project in succession single portions of a picture onto a stationary surface. The picture is figuratively divided into linear elements or point elements projected one after another onto a stationary line or point, the said elements being projected in close succession or at a uniform distance apart.

Figures 1 to 3 are diagrammatic views illustrating a theory upon which is based the operation of the present apparatus;

Figure 4 is a view illustrating geometrically the manner in which the reflecting surface of the helix is produced;

Figure 4ª is a partial section of said helix;

Figures 5 and 5ª are views similar to Figures 4 and 4ª, respectively, illustrating a different form of the helix;

Figures 6 and 6ª are similar views of another form;

Figure 7 is a partial diagrammatic view of the essential parts of an optical compensation apparatus embodying the features of the present invention;

Figures 8ª, 8ᵇ and 8ᶜ are diagrammatic views illustrating the different phases of the movements of the images of a picture;

Figures 9ª and 9ᵇ are diagrammatic views showing the development of one helix and a number thereof, respectively;

Figure 10 is a partial view of one form of mirror used;

Figure 11ª is a view of a diaphragm disc employed in connection with the invention;

Figures 11ᵇ and 11ᶜ are views of other types of cylindrical diaphragms which may be used;

Figure 12 is a partial diagrammatic view illustrating the arrangement wherein two similar reflecting surfaces are revolved about a common axis;

Figures 13 to 21 are diagrammatic views illustrative of the movement of a film through the length of one picture;

Figures 22ª, 22ᵇ, 23ª and 23ᵇ are perspective views of different forms of reflecting surfaces; and Figure 24 is a view illustrating diagrammatically the formation of a reflecting helix such as shown in Figure 9ᵇ.

Referring to the diagrammatic illustration of Figure 1, the theoretical term "line" is replaced by the practical term "strip".

The strips A, B, C are to be successively projected on the area of the strip $y$.

Referring to the diagrammatic illustration of Figure 2, the theoretical term "points" is replaced by the practical term "square". The squares $a, b, c, d, e, f, g, h, i$, are to be projected in succession on the area of the square $x$.

The problem of the optical compensation of the movement of the kinematographic picture to be projected applies to the first example. The successive projection of the picture strip by strip is equivalent to a shifting of the same; as illustrated diagrammatically in Figure 3, the compound image A, B, C is projected onto I at the beginning of the shift and onto II at the end of the same.

Taking for instance the case of kinematographic projection, in which the picture moves, the projected image must be caused to remain stationary on a surface while the said picture moves. It is moreover necessary for optical compensation, that the shift of the picture as shown in Figure 3 should finish in a jerk so to speak, whereafter the following shift takes place with the same initial and end movements.

According to the present invention the above requirements are fulfilled by shifting the film by means of a reflecting surface which is revolved constantly and in synchronism with the movement of the film, the generatrix of the said surface being an arc of a circle the limiting chord of which is defined by a straight line joining the extremities of said arc. Three constructions of the revolving and reflecting surface are described hereunder and are referred to as the reflecting helix, the reflecting spiral and the tilting reflecting groove the inclination of which to the axis of gyration varies constantly.

Referring to Figure 4, the reflecting surface of the helix is produced geometrically by rotating an arc of a circle 1 about a point 2 of its radius while the said point 2 is linearly moved say from 2ª to 2ᵇ and 2ᶜ so that the said arc in the course of a turn is successively at 1ª, 1ᵇ and 1ᶜ. A practical embodiment is shown in partial section in Figure 4ª.

Referring to Figure 5, the reflecting surface of the spiral is produced geometrically by rotating an arc 1 about a point 2 of its extended chord while the said point is linearly moved say from $2^a$ to $2^b$ and $2^c$ so that the arc in the course of a turn is successively at the points $1^a$, $1^b$ and $1^c$. A practical embodiment is illustrated in Figure $5^a$.

Referring now to Figure 6, the tilting groove (with constantly altering inclination) is geometrically produced by rotating an arc 1 about a point 2 of its extended chord 3 while the said point 2 moves along an arcuated path, say from $2^a$ to $2^b$ and $2^c$ so that in the course of a turn the arc is successively at $1^a$, $1^b$ and $1^c$. An embodiment is illustrated in Figure $6^a$; the angle of inclination $a^1$, $a^2$ of the chord $z$ to the axis of gyration constantly increases from the initial point to the end point.

If now the reflecting helix or the tilting groove is divided into any desired number of equal portions $k^1$, $k^2$, $k^3$ ... $k^n$, as illustrated in Figure $4^a$, these portions are fully equivalent as regards their geometrical shape and therefore as regards their optical effect. The optical axis of each portion however appears to be shifted parallel to itself and relatively to that of the adjacent portion by the same linear unit. In the tilting groove the said axis appears to be turned through the same angular unit. Furthermore, the reflecting surface is covered so that only one portion reflects a stationary object (a picture for example) onto any desired surface. The reflecting surface is now revolved so that the initial portion is replaced by the adjacent portion and then by the following and so forth. Thus the optical axis and therefore the projected image of the stationary picture is shifted without the projected image undergoing any alteration because the portions of the reflecting surface are equivalent as regards geometrical shape and optical effect. This is obtained only approximately with the reflecting spiral because the differential quotient of a spiral (contrary to that of a helix) is not constant.

The concave as well as the convex plane of the reflecting surface described in the foregoing may be used, but only the concave side of the same is dealt with in the following.

Forming an image by means of a portion of a reflecting surface as above referred to is a different proposition from doing so with a spherical mirror because the various meridian sections are dissimilar. It is known to correct the image reflected by such surfaces by means of cylindrical lenses or cylindrical mirrors. Since the shape of the surface of a uniform hollow mirror (whether elliptical, parabolic, hyperbolic or spherical) has no effect on the projected image at a small aperture, correction may be completely dispensed with in practice by using the required aperture and radii. This is more particularly the case with the reflecting helix if the radius of the arc of a circle formed is equal to the circle of inclination of the helical line, according to the formula $$R = r - \frac{h^2}{4\pi 2r}$$

in which $r$ is the distance between the centre of gyration and the arc produced, and $h$ is the shift of the said centre of gyration. By "circle of inclination" is meant the circle which coincides as accurately as possible with the curve, that is to say which is as nearly identical as possible with the same. The extent to which the projected image is displaced is determined by the extent to which the centre of gyration is shifted and the distance between the object or picture to be projected and the reflecting surface.

The linear shift V of the centre of gyration and the distance $a$ between the film window and the reflecting surface are in the following mathematical relation when using for instance the reflecting helix as a means for optically compensating the movement of the picture and also provided that the distance between the film window and the reflecting surface is within the limits of the single and double focal distance, that is to say between $f$ and $2f$ (the size of the film used being normal, with 19 millimetres spaces between the pictures):

$$V = 9.5(1 + \frac{2f-a}{a})$$

The required shift of the centre of gyration is for instance 9.5 millimetres when the film window is away by $2f$. Particular stress is to be laid upon this arrangement because the refractive power of the projection lens is not modified whereas it is at any other distance apart of the film window.

Figure 7 illustrates the essentials of an optical compensation apparatus of the kind referred to. The film window 5, adapted to encompass two pictures, is traversed by the light passing through the condenser 4 and coming from the source 3, the film 6 moving past the said window in the direction of the arrow 7. This movement is reflected in the plane mirror 9 in the direction of the arrow 8, the said mirror projecting the image of the film window through the aperture of the diaphragm 10 onto the reflecting surface 11 of the reflector 12 shown in section, revolving about its axis 13 in synchronism with the moving film so that the image of the moving film is stationary in the plane mirror 14 and is projected onto the projection lens 15 through which it is projected onto the projection surface 16. At the end of a revolution the image of one picture gives way to the following, the phases of this being diagrammatically illustrated in Figures 8ª, 8ᵇ and 8ᶜ, the horizontal hatchings representing the outgoing image and the vertical hatchings representing the incoming image.

It is assumed, with reference to the construction described in the foregoing, that in the geometrical formation of all three reflecting surfaces the centre of gyration of the arc of a circle goes through one linear or arcuated shift in the course of one revolution, that is to say the reflecting helix moves through one helix, the reflecting spiral moves through one spiral and the tilting groove goes through one tilt. Should it however be necessary to cause the reflecting surface to go through a smaller and secondary number of revolutions, the number of spirals, helices and tiltings gone through may be any desired in theory but depends in practice upon the ratio of values. Each helix, spiral or groove has the same pitch as the one-helix reflecting surface. If the area of the reflecting helix is shown flat in development, the reflecting groove has a development as in Figure 9ª when one helix is present and as in Figure 9ᵇ when several helices are present (about six in the example under consideration).

The above-described arrangements may be reversed by reciprocating a diaphragm in front of a stationary reflecting surface instead of moving a reflecting surface behind a stationary diaphragm. The said stationary reflecting surface is produced by cutting a sector out of a reflecting surface with several helices as illustrated in Figure 9ᵇ, the said sector containing one helix. A portion of mirror 17 of this kind is shown in elevation in Figure 10. The reciprocation of the diaphragm being a difficult proposition in practice, a known arrangement is resorted to, (Figure 11ª) in which a discontinuous slot 18¹, in the shape of an arithmetic spiral, is cut out of a diaphragm disc 18 which is constantly rotating.

The rotating diaphragm may be given various shapes, hitherto not known. It may be shaped as a cylinder 19 (Figure 11ᵇ) in which is cut a helix-like slot 19¹. Figure 11ᶜ shows another shape in which a cylindrical diaphragm 20 is peripherally provided with uniform recesses 20¹ parallel with the axis of the cylinder.

As regards optical compensation, the view was hitherto held that the use of the window covering the area of two film pictures was absolutely necessary. It is however possible to use a picture window encompassing one film picture only and without altering the optical compensation device. In the course of the movement of the film through the length of one picture, the space between two pictures travels from the upper edge to the lower edge of the window and takes for example the positions illustrated in Figures 13, 16 and 19, the first pictures travelling past the window being shown in dotted lines and the second in full lines. The optical compensating device (for instance one of the compensating reflecting surfaces shown) projects the moving space, in the course of the travel of the film through the length of a picture, always onto the same point so that the positions according to Figures 13, 16 and 17 are projected (through a diaphragm encompassing two pictures) as shown in Figures 14, 17 and 20. The dividing space decomposes this image into an upper and a lower half, each having the dimensions of a picture. If now these two halves are superposed so that the lines 31—33 and 33—35 and also the lines 32—34 and 34—36 are superposed, the result is as in Figures 15, 18 and 21, which are complete images. Although the latter are at certain points (Figures 15 and 21) simple images of a film picture, they are nevertheless composed of two pictures following each other, as in Figure 18. By superposing these images optically, an assembled picture is produced in which there is a continuous transition of the image of one film picture into the image of the following, so that the requirements of optical compensation are completely fulfilled. The images may be optically superposed by means of various known devices, such as for example twin prisms as used in stereoscopes; two lenses or hollow mirrors the optical axes of which are shifted or inclined relatively to each other; or finally by means of mirrors set at an angle. The same effect may be produced by using two such optical compensating devices simultaneously which may be set so that each of them encompasses two pictures following each other, but the images produced are superposed in the manner just described. The provision of two optical compensating devices appears to complicate the arrangement, but on the other hand the device for superposing the images is dispensed with.

The reflecting means according to the invention are also an improvement over known means for projecting images point by point onto a surface. The simplest way of doing this is to use two reflecting surfaces having one helix. These two surfaces are positioned so that the direction of shift of the image is displaced by one surface by 90° relatively to the direction of shift of the image by the other. Thus one of the reflecting surfaces projects in succession the horizontal strips A, B, and C onto $y$, as shown in Figures 1 and 2; the other reflecting surface projects into $x$ square by square the horizontal strip at $y$. In connection with the example of Figure 2, it is obvious that the second reflecting surface must complete one revolution while the first one goes through one-third of a revolution, so that in this case (9 squares to the image) the second reflecting surface must revolve at three times the speed of the first. In other words, when using one-helix reflecting surfaces, the second surface must complete a number of revolutions which is $n$ times as large as those of the first surface when the number of squares is $n^2$. The number of revolutions may however be reduced as for optical compensation by providing the second surface with several helices instead of one. For example, if both the reflecting surfaces are to revolve at the same speed and if the number of squares is $n^2$, the second reflecting surface is to be provided with $n$ times the helices of the first. Figure 12 diagrammatically illustrates the arrangement of the various elements when the two similar surfaces are to revolve about a common axis. The reflecting surface 40 provided with one helix and the reflecting surface 41 provided with say three helices are co-axially mounted. The surface 40 projects in succession onto the strip-like diaphragm 42 horizontal rows of three squares out of the nine of which the image is composed. The drawing shows the central horizontal strip, comprising the squares $d$, $e$ and $f$, being projected onto the diaphragm 42. A deflecting device 43 is provided, which may comprise a deflecting prism of the known kind or, as shown in the construction illustrated, a combination of several mirrors set at an angle to each other. This deflecting device reflects the horizontal row of diaphragm 42 onto the diaphragm 44 which is turned by 90° relatively to 42. The three-helix reflector 41 reflects successively the squares encompassed by the diaphragm 44 onto the square diaphragm 45. In the example illustrated the square $e$ is being reflected onto 45. Thus an object or picture may be successively projected point by point onto a point-like diaphragm.

All the reflecting surfaces described in the foregoing may be produced in any known manner or may be produced simply by: (1) an accurate portion of a sphere 46 (Figure 22ª) which may be easily made, cut meridionally at 47 and thereafter bent to the desired pitch, as shown in Figure 22ᵇ, or (2) a cylindrical surface is easily made (Figure 23) and bent as shown in Figure 23ᵇ.

Reflecting surfaces with several helices may be made in a simpler manner by making for instance a one-helix surface with a pitch of 6 centimetres instead of a surface with six helices of 1 centimetre each. If for example the periphery of a reflecting helix is shown flat, the illustration of Figure 9ᵇ becomes that of Figure 24. Six sectors or portions for instance are cut out of this and are closed, level with each other, into a ring. In a general manner, this simplification in producing the said surface lies in the fact that in place of a reflecting surface having $n$ helices of a pitch $h$, there is produced a one-helix surface having the pitch $n\ h$, the said surface being divided and its fractions arranged in another manner for the purpose of obtaining the surface desired.

Having now particularly described and ascertained the nature of my said invention and in what manner the same is to be performed, I declare that what I claim is:—

1. Optical projecting apparatus including a body, and means for continuously rotating said body around an axis, said body having a reflecting surface the generatrix of which is a circular segment, and which has such a shape, as produced geometrically when the limiting chord of the generating circular segment, in its travel around the rotation axis, travels along a tangent to this circular segment.

2. Optical projecting apparatus including a body, and means for continuously rotating said body around an axis, said body having a reflecting surface the generatrix of which is a circular segment and which has such shape as originates geometrically upon the limiting chord of the generating circular segment in its path around the rotation axis, travelling along a tangent to the circular segment, which tangent encloses an angle of 0° with the rotation axis.

3. Optical projecting apparatus including a body having a reflecting surface the cross section of which is hollow and uniform, and means for continuously rotating said body around an axis, the generatrix of said reflecting surface being a circular segment which is of such a form as produced geometrically if the limiting chord of the generating circular segment, in its path around the rotation axis, travels along a tangent to the circular segment.

4. In an optical projection apparatus, the combination with a body having a reflecting surface continuously rotatable around an axis, the generatrix of said reflecting surface being a circular segment, and having such a shape as is produced geometrically if the limiting chord of the generating circular segment, in its travel around the rotation axis, travels along a tangent to its circular segment; of devices for the projecting of light rays on the reflecting surface, devices for the uninterrupted guiding of a picture film through a picture window arranged in the travel of the light rays, and means for causing the uninterrupted rotation of said body and its reflecting surface at a speed which bears a certain ratio to the travelling speed of the film.

5. Optical projecting apparatus including a body continuously rotating around an axis and having a reflecting surface, means for rotating said body, the generatrix of said reflecting surface being a circular segment which has such a form as is produced geometrically if the limiting chord of the generating circular segment, during its travel around the rotating axis, travels along a tangent to said circular segment, devices for the production of light rays on the reflecting surface, a picture window arranged in the path of the light rays, and devices for the uninterrupted guiding of a moving picture film through said window, said rotating reflecting surface being hollow and the distance of the picture window being equal to its radius of curvature.

6. Optical projecting apparatus including a body having a reflecting surface continuously travelling around an axis, the generatrix of said reflecting surface being a circular segment and having such a form as is produced geometrically if the limiting chord of the generating circular segment during its path around the rotating axis travels along a tangent to said circular segment, devices for the projection of light rays on the reflecting surface, a picture window arranged in the path of the light rays, means for uninterruptedly guiding a picture film through said window, and devices for the uninterrupted rotation of the reflecting surface with a speed which bears a certain ratio to the speed of the motion of the film, the rotation axis around which the generating circular segment revolves being parallel to a picture or cinematographic film.

In testimony whereof, I affix my signature.

PAUL HATSCHEK.